United States Patent [19]
Hurst et al.

[11] Patent Number: 6,161,822
[45] Date of Patent: Dec. 19, 2000

[54] SINGLE POINT ATTACHMENT MOUNT

[75] Inventors: Dennis Ray Hurst, Dayton; Todd A. Bishop, Centerville, both of Ohio; David John Fanson, Ann Arbor, Mich.

[73] Assignee: General Motors Corporation, Detroit, Mich.

[21] Appl. No.: 09/187,701

[22] Filed: Nov. 6, 1998

[51] Int. Cl.⁷ .................................................. B60G 13/00
[52] U.S. Cl. ................................. 267/220; 280/124.155; 188/321.11
[58] Field of Search ...................... 267/220, 195, 267/64.23, 64.27, 64.24, 64.19, 64.25; 280/124.155, 124.154; 188/321.11

[56] References Cited

U.S. PATENT DOCUMENTS

| | | | |
|---|---|---|---|
| 4,721,325 | 1/1988 | Mackovjak et al. | 267/33 |
| 5,000,429 | 3/1991 | Wittmar et al. | 267/220 |
| 5,150,886 | 9/1992 | Hamberg et al. | 267/220 |
| 5,211,380 | 5/1993 | Germano | 267/221 |
| 5,248,134 | 9/1993 | Ferguson et al. | 267/220 |
| 5,263,694 | 11/1993 | Smith et al. | 267/220 |
| 5,275,389 | 1/1994 | Pinch et al. | 267/220 |
| 5,308,048 | 5/1994 | Weaver et al. | 267/220 |
| 5,454,585 | 10/1995 | Dronen et al. | 267/220 X |
| 5,467,971 | 11/1995 | Hurtubise et al. | 267/220 |
| 5,487,535 | 1/1996 | Carter et al. | 267/220 |
| 5,492,314 | 2/1996 | Drennen | 267/220 |
| 5,678,808 | 10/1997 | Claude et al. | 267/64.15 |
| 5,678,810 | 10/1997 | Summers, III et al. | 267/220 |
| 5,690,319 | 11/1997 | Robinson et al. | 267/64.19 |

FOREIGN PATENT DOCUMENTS

| | | |
|---|---|---|
| 3532681A | 3/1987 | Germany . |
| 2-253026 | 10/1990 | Japan . |

*Primary Examiner*—Matthew C. Graham
*Assistant Examiner*—Pamela J. Lipka
*Attorney, Agent, or Firm*—Edmund P. Anderson

[57] ABSTRACT

A damper mount assembly includes a lower plate that is substantially rigid and has a main body with a first end and a second end. The main body includes a first engagement surface near the first end and includes a support surface between the first and second ends. An upper plate is fixed relative to the lower plate and includes a central opening and a second engagement surface engaging the first engagement surface. A single attachment stud extends through the central opening connecting the mount to a vehicle body tower. A resilient cushion assembly is compressed between the upper plate and the lower plate and engages the support surface. The resilient cushion assembly carries a rigid structural insert that has a mounting opening and the rigid structural insert is movable relative to both the upper plate and the lower plate by deformation of the resilient cushion assembly.

18 Claims, 2 Drawing Sheets

SINGLE POINT ATTACHMENT MOUNT

TECHNICAL FIELD

The present invention relates to a damper mount assembly and particularly, to a single point attachment mount assembly for vehicle suspension dampers.

BACKGROUND OF THE INVENTION

The typical vehicle suspension includes a damper in the form of a strut or a shock that is mounted between the sprung (body), and unsprung (wheel assembly) masses of the vehicle to dampen spring oscillations. The lower end of the damper is connected to the wheel assembly in a suitable manner and the upper end is connected to the vehicle body's structure, usually at a tower, by an upper damper mount assembly. With conventional upper mounts, the coil spring supports the weight of the vehicle and creates a force that is proportional to the relative velocity between the vehicle's wheel and its body, transferring loads to the mount. In addition, a jounce bumper acts as a stop for compression directed movement of the damper transferring loads to the mount. Since the damper is connected to the body by the upper mount, the upper mount must support the total weight of the vehicle and provide acceptable isolation. Achieving these properties requires proper tuning of the mount. Tuning is complicated by the fact that relatively high spring and jounce bumper loads have to be accommodated through the mount.

Conventional upper mounts include at least one resilient element (rubber cushion), to isolate and reduce the transmission of input forces to the body. An upper mount is generally required to be firm enough to support the weight of the body while simultaneously resilient enough for isolation purposes. For certain inputs, deflection of the upper mount is desirable while for other inputs it is preferable for the upper mount to resist deflection. Single path upper mounts are known, wherein the actuator or damper rod and a coil spring seat are fastened together and the load path is through a single rubber cushion. The single rubber cushion accommodates the forces generated by both the actuator or damper and the cooperating coil spring. The rubber cushion is preloaded by the vehicle's weight. Dual path mounts are also known, wherein the actuator or damper rod and the coil spring seat are not fastened together and wherein the load path is through separate rubber cushion assemblies. A first rubber cushion assembly engages the coil spring and supports the vehicle's weight and the second rubber cushion assembly engages the actuator or damper rod and is not preloaded by vehicle weight.

The conventional upper mount assembly is attached to the tower by a plurality of fasteners that are distributed around the mount near its outer perimeter. It is also known to secure the mount to the tower by placing components of the mount on opposite sides of the tower and capturing them by a nut threaded to the piston rod tenon of the damper. Both of these techniques require a substantial number of components and can tend to be rather complicated. Accordingly, a need exists for a simplified upper mount assembly that is easily attached to the vehicle's tower and includes relatively few individual components.

SUMMARY OF THE INVENTION

The present invention provides an upper mount assembly directed to the aspects of being relatively easily attached to the vehicle's tower, including relatively few individual components and exhibiting packaging and tuning flexibility. Attachment is accomplished through a single point that advantageously expedites assembly of the associated vehicle's suspension system. The upper mount is rigidly attached to the vehicle body by clamping the vehicle's tower to components of the mount. The damper rod tenon is free to move relative to the clamping members of the mount and relative to the tower, while preferably no relative movement occurs between the clamping members of the mount and the tower.

More specifically, an aspect of the present invention provides a damper mount assembly that has a lower plate that is substantially rigid and has a main body with a first end and a second end. The main body includes a first engagement surface near the first end and includes a support surface between the first and second ends. An upper plate is fixed relative to the lower plate and includes a central opening and a second engagement surface engaging the first engagement surface. A single attachment stud extends through the central opening connecting the mount to a vehicle body tower. A resilient cushion assembly is compressed between the upper plate and the lower plate and engages the support surface. The resilient cushion assembly carries a rigid structural insert that has a mounting opening and the rigid structural insert is movable relative to both the upper plate and the lower plate by deformation of the resilient cushion assembly.

According to an optional aspect of the present invention, the damper mount is assembled by first connecting a lower plate and cushion assembly to the damper rod tenon. An upper plate assembly is then attached to the lower plate and cushion assembly preferably, through the use of a twist-lock feature that is provided on the upper and lower plates. As an optional alternative, fasteners are used to hold the two plates together. After the plates are connected, the mount is attached to the vehicle body tower by a single stud.

Another optional aspect of the present invention resides in a locating washer that provides an alignment adjustment feature. The locating washer extends into the tower opening and has an off-center hole that the attachment stud extends through. By rotating the locating washer the attachment point is changed relative to the vehicle body tower. When the preferred attachment alignment is achieved, a nut is threaded onto the attachment stud locking the assembly to the vehicle body tower.

BRIEF DESCRIPTION OF THE DRAWINGS

The present invention will now be described, by way of example, with reference to the accompanying drawing in which.

DESCRIPTION OF THE PREFERRED EMBODIMENT

Figure 1:
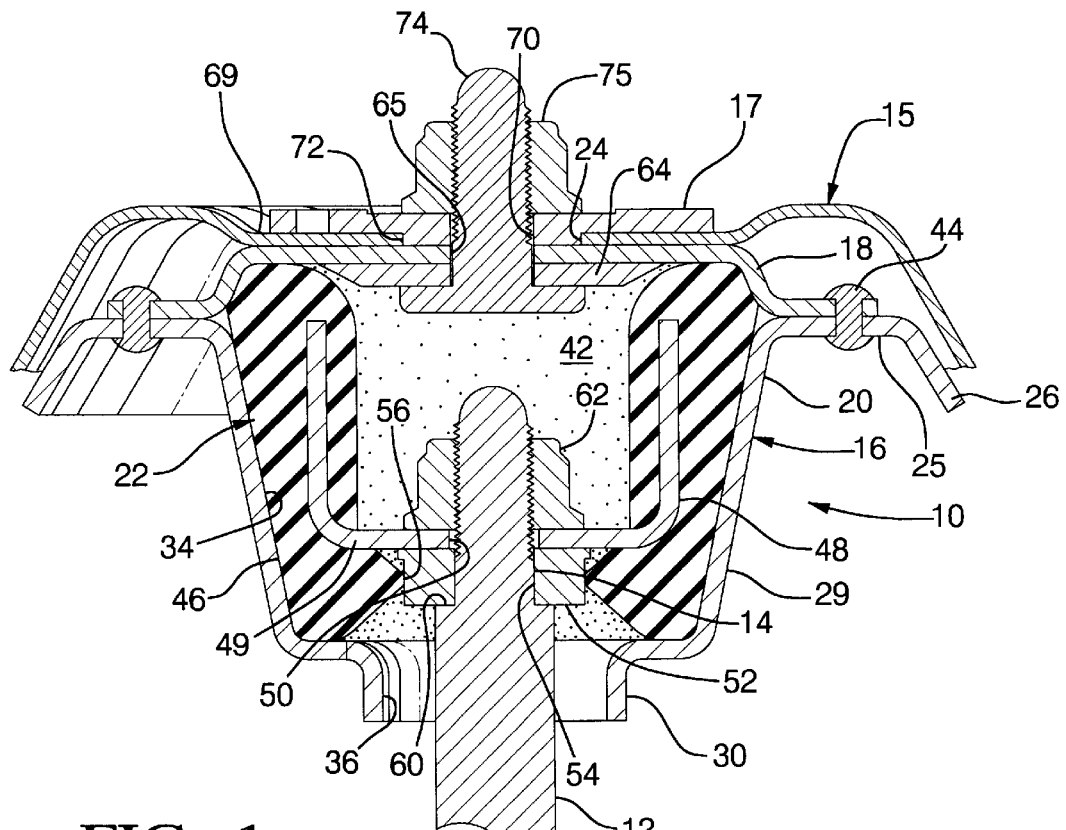
FIG. 1 is a fragmentary cross sectional illustration of a damper mount assembly according to the present invention.

Referring to FIG. 1, an upper mount assembly 10 for connecting a damper rod 12 at its tenon 14 to a vehicle body tower 15 is illustrated. In general, an upper mount 16 is rigidly attached to the tower 15 of an associated vehicle's body, by trapping the tower 15 between two components of the mount 16 that are designated as locating washer 17 and upper plate 18. The damper rod tenon 14 is free to move relative to the tower 15. No relative movement is intended between the upper plate 18 and the tower 15 once the assembly is complete. This preferred illustrated embodiment provides for two separate load paths through the mount 16. The loads created by the damper and transmitted from the damper rod 12, pass through an elastomeric cushion assembly 22 to the vehicle tower 15. Other loads transmitted to the mount 10 pass through a bearing (not illustrated) if utilized, and then through the lower plate 20, and the upper plate 18, to the vehicle tower 15.

More specifically, as shown in FIG. 1, the tower 15 comprises an inverted cup-shaped element with an annular side-wall, and is formed as part of a vehicle body stamping in a well-known manner, and includes an opening designated as tower opening 24. In the present embodiment the tower 15 is of a round or circular shape with the general shape of the mount 16 being provided in a corresponding shape for mating reception therein, so that no specific initial assembly orientation of the mount 16 relative to the tower 15 is required in an angular direction. This assists in simplifying assembly of the mount 16 to the vehicle. Optionally, the mount 16 can be adapted to additional shapes such as oval or oblong. These other shapes may present some advantages in specific applications such as allowing the mount to have performance differentials (tunability) in the different motion directions of the vehicle suspension.

The lower plate 20 is substantially rigid in the present embodiment and is formed of an acceptably material such as metal. Specifically, the lower plate 20 includes a main body 29 with a counter-turned first end 25 engaging the upper plate 18 at an engagement surface, where the first end 25 includes flange 26. A second end 30 is provided across the main body 29 of the lower plate 20 from the first end 25 and is disposed downwardly and radially inwardly relative to the first end 25. The main body 29 includes a plurality of openings near the first end 25. A support surface 34 is provided on the inside of the main body 29 between the first end 25 and the second end 30, facing generally inwardly and upwardly and is disposed below the tower 15. The lower end 30 terminates forming an enlarged opening 36 that receives the damper piston rod 12.

Figure 2:
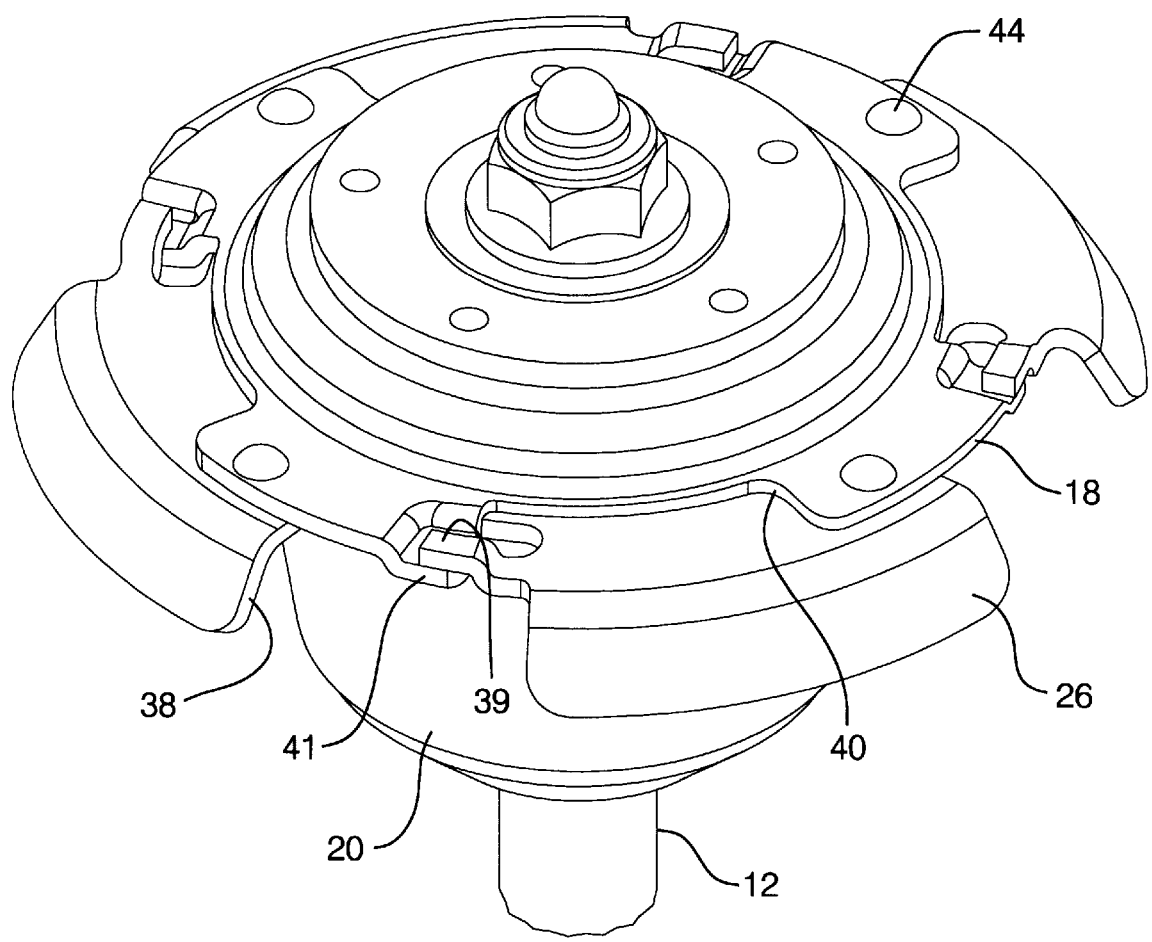
FIG. 2 is a perspective view of the mount of the damper mount assembly of FIG. 1.

The lower plate 20 is interlocked with the upper plate 18 as shown in FIG. 2. Lower plate 20 includes a number of notches 38 that are formed in the flange 26 of end 25 and are distributed around the lower plate 20. Within each of the notches 38, an offset tab 39 extends generally in a clockwise direction when the lower plate 20 is viewed from above. Similarly, the upper plate 18 has a series of notches 40 distributed in a matching pattern around the perimeter of upper plate 18. An offset tab 41 presents itself in each of the notches 40 in a counterclockwise direction for mating reception of the tabs 39, so that the upper plate 18 and the lower plate 20 are connected together in a twist-lock fashion. As seen in FIG. 1, this compresses and captures the cushion assembly 22 within a cavity 42 formed in the interior of the mount 16 between the upper and lower plates 18, 20. Optionally, the cushion assembly 22 is bonded to the support surface 34 of the lower plate 20 by a process well known in the art. After the plates 18 and 20 are connected, they are fixed together by a plurality of fasteners 44 before assembly to the vehicle tower 15.

The cushion assembly 22 is constructed of an elastomeric body 46 that is appropriately shaped for positioning within the cavity 42 and for providing a selected level of damping between the rod 12 and the tower 15. The cushion assembly 22 also includes a metal rigid structural insert 48 that is formed within the elastomeric body 46 and that includes a horizontal wall 49 with an axial opening 50 that is substantially aligned with the opening 36 of the lower plate 20. The cushion assembly 22 may also optionally utilize additional inserts to provide proper fit and positioning relative to the damper rod 12. The shape of the cushion assembly 22 and its physical properties may be altered as necessary to enhance performance of the mount 16 in a manner known in the art. A relatively thick annular structural body 52 is positioned against the horizontal wall 49 by a flat base and exhibits an opening 54 that is substantially aligned with the openings 50 and 36. The structural body 52 is located within the mount 16 by an annular rib 56 of elastomeric body 46 and is positioned therein as a separate piece or is secured in place during the forming process of the elastomeric body 46 along with the structural insert 48.

The damper piston rod 12 extends through the opening 36, the opening 50 and the opening 54 and is securely maintained in position by shoulder 60 and by a nut 62 which is threaded onto the piston rod tenon 14, clamping the rod into position relative to the structural body 52 and the structural insert 48. Connection of the rod 12 to the cushion assembly 22 is completed prior to assembly of the lower plate 20 to the upper plate 18 and before connection of the mount 16 to the vehicle tower 15. Through this structure, the damper piston rod 12 moves relative to the tower 15 and the upper and lower plates 18, 20 by means of deflection of the elastomeric body 46. At the same time, the piston rod 12 is fixed in position relative to the nut 62, the structural body 52 and the structural insert 48, with the tenon 14 being suspended near the center of the mount 16 and below the upper plate 18. According to this preferred illustrated embodiment, the lower plate 20, elastomeric body 46, insert 48, body 52, nut 62 and damper piston rod 12 are assembled together prior to assembly of the system within the tower 15. For connection to the tower 15, the upper plate 18, as part of the pre-assembled unit, is positioned against the tower 15. The upper plate 18 includes a reinforcing plate 64 and includes an opening 65 that is aligned with the tower opening 24.

The flange 26 of lower plate 20 operates to assist in locating the mount 16 within the vehicle tower 15 during assembly since it has a shape that substantially corresponds to that of the vehicle tower 15. The locating washer 17 is positioned against vehicle tower 15 within a pocket 69 that is formed around the tower opening 24 and includes an opening 70 that is aligned with the tower opening 24. A cam-like extension designated as annular leg 72 extends as an integral part of locating washer 17, and is closely received within the tower opening 24. An attachment stud 74 extends through the reinforcing plate 64, the upper plate 18, the vehicle tower 15 and the locating washer 17, and together with nut 75 locks the mount 16 to the vehicle tower 15. The stud 74 is pressed into the opening 65 of upper plate 18 so that it is maintained in position during assembly to the vehicle tower 15. Attachment is accomplished by means of a single point connection since it occurs simply by means of the nut 75 being threaded onto the stud 74. No other fasteners are required to attach the mount 16 to the vehicle tower 15.

Figure 3:
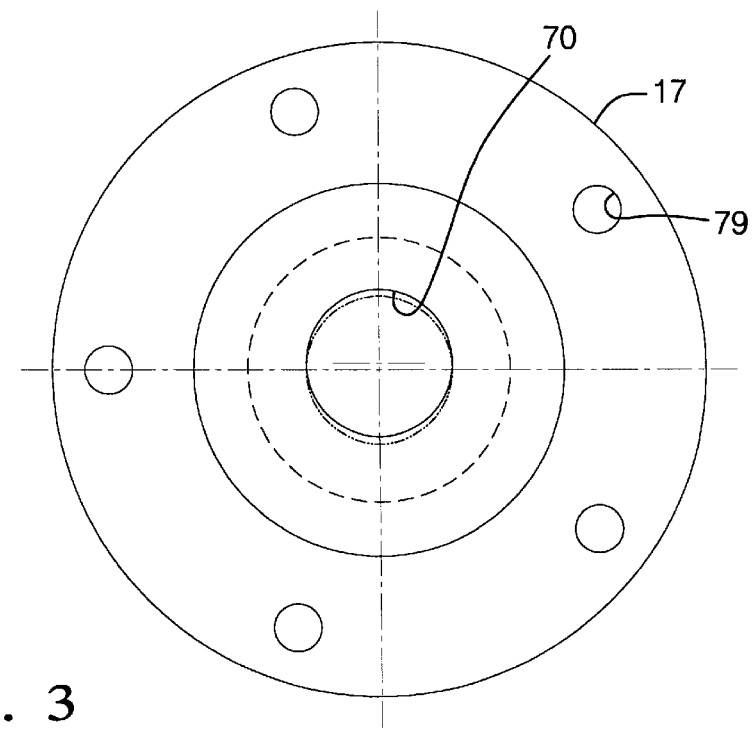
FIG. 3 is a detail illustration of a locating washer usable with the damper mount assembly of FIG. 1 according to an optional aspect of the present invention.

The locating washer 17 provides the optional feature of serving as a simple camber and caster adjustment mechanism in the associated vehicle suspension system. As seen in FIG. 3, the opening 70 is slightly off-center in the locating washer 17. A series of engagement openings 79 are provided in the locating washer 17 so that when the nut 75 is loose on the stud 74, the locating washer can be turned, changing the location of the damper rod 12 relative to the tower opening 24. The cam 72 on the locating washer engages the vehicle tower 15 within tower opening 24 to effect relocation of the opening 70 when the locating washer is turned.

Accordingly, an upper mount assembly is provided that is relatively easily attached to the vehicle's tower, includes relative few individual components, and exhibits tuning and packaging flexibility. Attachment to the vehicle tower is accomplished through a single point type connection system that advantageously expedites assembly of the associated vehicle suspension system. The upper mount is rigidly attached to the vehicle body by trapping the vehicle's tower between two rigid components of the mount while the damper rod tenon is free to move relative to the clamping members of the mount and relative to the tower, while preferably no relative movement occurs between the clamping members of the mount and the tower. As an optional feature, the upper mount assembly incorporates a simplified camber and caster adjustment mechanism.

What is claimed is:

1. A damper mount assembly comprising:
   a lower plate that is substantially rigid and has a main body with a first end and a second end wherein the main body includes a first engagement surface near the first end and includes a support surface between the first and second ends;
   an upper plate fixable relative to the lower plate and including a central opening and a second engagement surface engaging the first engagement surface wherein the upper plate and the lower plate are substantially immovable relative to each other;
   an attachment stud extendible through the central opening;
   a resilient cushion assembly compressible between the upper plate and the lower plate and engageable with the support surface wherein the resilient cushion assembly carries a rigid structural insert that has a mounting opening and wherein the rigid structural insert is movable both to the upper plate and the lower plate by deformation of the resilient cushion assembly; and
   a locating washer having an offset opening that is disposed off-center in the locating washer and is aligned with the central opening.

2. A damper mount assembly comprising:
   a lower plate that is substantially rigid and has a main body with a first end and a second end wherein the main body includes a first engagement surface near the first end and includes a support surface between the first and second ends;
   an upper plate fixable relative to the lower plate and including a central opening and a second engagement surface engaging the first engagement surface, wherein the upper plate and the lower plate are substantially immovable relative to each other;
   a resilient cushion assembly compressible between the upper plate and the lower plate and engageable with the support surface wherein the resilient cushion assembly carries a rigid structural insert that has a mounting opening and wherein the rigid structural insert is movable both to the upper plate and the lower plate by deformation of the resilient cushion assembly;
   a vehicle body tower having a tower opening; and
   an attachment stud extending through the tower opening and the central opening wherein the attachment stud provides the sole means of attaching the upper plate to the vehicle body tower.

3. A damper mount assembly according to claim 2 wherein the upper and lower plates are interlocked through a first set of tabs on the lower plate that engages a second set of tabs on the upper plate.

4. A damper mount assembly according to claim 2 further comprising a damper rod wherein during assembly of the damper mount assembly, the damper rod is fixed to the rigid structural insert of the resilient cushion assembly before the lower plate is fixed relative to the upper plate and before the upper plate is attached to the vehicle body tower.

5. A damper mount assembly according to claim 4 wherein the damper rod is suspended by the resilient cushion relative to the tower wherein loads from the damper rod are transmitted through the resilient cushion to the tower.

6. A damper mount assembly comprising:
   a damper rod;
   a lower plate that is substantially rigid and has a main body with a first end and a second end disposed radially inwardly and downwardly from the first end wherein the second end forms a damper rod opening and wherein the main body includes a first engagement surface near the first end and includes a support surface between the first and second ends;
   an upper plate fixable relative to the lower plate and including a central opening and a second engagement surface engaging the first engagement surface, wherein the upper plate and the lower plate are substantially immovable relative to one another;
   a resilient cushion assembly compressible between the upper plate and the lower plate and engaging the support surface wherein the resilient cushion assembly carries a rigid structural insert that has a mounting opening and wherein the rigid structural insert is movable both to the upper plate and the lower plate by deformation of the resilient cushion assembly, wherein the damper rod includes a tenon that extends through the mounting opening and is fixed relative to the rigid structural insert so that the tenon is suspended below the central opening and is movable relative to the central opening; and
   a locating washer having an offset opening that is disposed off-center in the locating washer and is aligned with the central opening.

7. A damper mount assembly comprising:
   a damper rod;
   a lower plate that is substantially rigid and has a main body with a first end and a second end disposed radially inwardly and downwardly from the first end wherein the second end forms a damper rod opening and wherein the main body includes a first engagement surface near the first end and includes a support surface between the first and second ends;
   an upper plate fixable relative to the lower plate and including a central opening and a second engagement surface engaging the first engagement surface, wherein the upper plate and the lower plate are substantially immovable relative to one another;
   a resilient cushion assembly compressible between the upper plate and the lower plate and engaging the support surface wherein the resilient cushion assembly carries a rigid structural insert that has a mounting opening and wherein the rigid structural insert is movable both to the upper plate and the lower plate by deformation of the resilient cushion assembly wherein the damper rod includes a tenon that extends through the mounting opening and is fixed relative to the rigid structural insert so that the tenon is suspended below the central opening and is movable relative to the central opening;

a vehicle body tower having a tower opening; and an attachment stud extending through the tower opening and the central opening wherein the attachment stud provides the sole means of attaching the upper plate to the vehicle body tower.

8. A damper mount assembly according to claim 7 wherein during assembly of the damper mount assembly, the damper rod tenon is fixed to the rigid structural insert of the resilient cushion assembly before the lower plate is fixed relative to the upper plate and before the upper plate is attached to the vehicle body tower.

9. A damper mount assembly according to claim 7 further comprising a locating washer having an annular leg extending into the tower opening and engaging the upper plate wherein the stud extends through the locating washer.

10. A damper mount assembly according to claim 9 further comprising a nut threaded on the stud and forcing the locating washer against the vehicle body tower.

11. A damper mount assembly according to claim 7 wherein the vehicle body tower includes a wall having a contour and wherein the lower plate includes a locating flange formed at the first end that extends generally away from the main body substantially following the contour of the wall so that the locating flange locates the lower plate relative to the vehicle body tower.

12. A damper mount comprising:

a damper rod;

a lower plate that is substantially rigid and has a main body with a first end and a second end disposed radially inwardly and downwardly from the first end wherein the second end forms a damper rod opening and wherein the main body includes a first engagement surface near the first end and includes a support surface between the first and second ends;

an upper plate fixable relative to the lower plate and including a central opening and a second engagement surface engaging the first engagement surface, wherein the upper plate and the lower plate are substantially immovable relative to one another;

a resilient cushion assembly compressible between the upper plate and the lower plate and engaging the support surface wherein the resilient cushion assembly carries a rigid structural insert that has a mounting opening and wherein the rigid structural insert is movable both to the upper plate and the lower plate by deformation of the resilient cushion assembly, wherein the damper rod includes a tenon that extends through the mounting opening and is fixed relative to the rigid structural insert so that the tenon is suspended below the central opening and is movable relative to the central opening; and a structural body engaging the rigid structural insert wherein the cushion assembly includes an annular rib that engages the structural body and locates the structural body within the damper mount assembly.

13. A damper mount assembly comprising:

a lower plate that is substantially rigid and has a main body with a first end and a second end wherein the main body includes a first engagement surface near the first end and includes a support surface between the first and second ends;

an upper plate fixable relative to the lower plate and including a central opening and a second engagement surface engaging the first engagement surface, wherein the upper plate and the lower plate are substantially immovable relative to each other;

a resilient cushion assembly compressible between the upper plate and the lower plate and engageable with the support surface wherein the resilient cushion assembly carries a rigid structural insert that has a mounting opening and wherein the rigid structural insert is movable both to the upper plate and the lower plate by deformation of the resilient cushion assembly; and an attachment stud extending through the central opening wherein the attachment stud is adapted for projection through an opening in a vehicle body tower and provides the sole means of attaching the upper plate thereto.

14. A damper mount according to claim 13 further comprising a damper rod wherein during assembly of the damper mount assembly the damper rod is fixed to the rigid structural insert of the assembly before the lower plate is fixed relative to the upper plate.

15. A damper mount assembly comprising:

a damper rod;

a lower plate that is substantially rigid and has a main body with a first end and a second end disposed radially inwardly and downwardly from the first end wherein the second end forms a damper rod opening and wherein the main body includes a first engagement surface near the first end and includes a support surface between the first and second ends;

an upper plate fixable relative to the lower plate and including a central opening and a second engagement surface engaging the first engagement surface, wherein the upper plate and the lower plate are substantially immovable relative to one another;

a resilient cushion assembly compressible between the upper plate and the lower plate and engaging the support surface wherein the resilient cushion assembly carries a rigid structural insert that has a mounting opening and wherein the rigid structural insert is movable both to the upper plate and the lower plate by deformation of the resilient cushion assembly, wherein the damper rod includes a tenon that extends through the mounting opening and is fixed relative to the rigid structural insert so that the tenon is suspended below the central opening and is movable relative to the central opening; and an attachment stud extending through the central opening wherein the attachment stud is adapted for projection through an opening in a vehicle body tower and provides the sole means of attaching the upper plate thereto.

16. A damper mount according to claim 15 further comprising a damper rod wherein during assembly of the damper mount assembly the damper rod is fixed to the rigid structural insert of the assembly before the lower plate is fixed relative to the upper plate.

17. A damper mount assembly according to claim 15 further comprising a locating washer having an annular leg adapted for extension into the opening in the vehicle body tower for engagement of the upper plate, wherein the stud extends through the locating washer.

18. A damper mount assembly according to claim 15 wherein the lower plate includes a locating flange formed at the first end that extends generally away from the main body and is adapted to follow a contour of a wall of the vehicle body tower so as to locate the lower plate relative to the vehicle body tower.

* * * * *